United States Patent [19]

Inoue et al.

[11] Patent Number: 5,785,350
[45] Date of Patent: Jul. 28, 1998

[54] METHOD OF PREPARING A SIDE COLLISION AIR BAG

[75] Inventors: Michio Inoue, Kagamigahara; Mariko Kawashima, Inazawa; Hisaaki Kato, Anjo; Makoto Shiota, Toyota, all of Japan

[73] Assignee: Toyota Jidosha Kabushiki Kaisha, Japan

[21] Appl. No.: 782,680

[22] Filed: Jan. 15, 1997

[30] Foreign Application Priority Data

Feb. 7, 1996 [JP] Japan .................................. 8-021095

[51] Int. Cl.⁶ .................................. B60R 21/16
[52] U.S. Cl. .................................. 280/743.2; 280/730.2; 493/405; 493/451
[58] Field of Search .................... 280/730.1, 730.2, 280/743.1, 743.2, 728.1; 493/405, 451, 458

[56] References Cited

U.S. PATENT DOCUMENTS

| 5,112,079 | 5/1992 | Haland et al. |
| 5,222,761 | 6/1993 | Kaji et al. |
| 5,224,732 | 7/1993 | Warner et al. |
| 5,251,931 | 10/1993 | Semchena et al. |
| 5,348,342 | 9/1994 | Haland et al. |
| 5,498,030 | 3/1996 | Hill et al. |
| 5,499,840 | 3/1996 | Nakano. |

FOREIGN PATENT DOCUMENTS

| 9405143 U | 3/1994 | Germany. | |
| 5-16751 | 1/1993 | Japan | 280/730.2 |
| 5-139238 | 6/1993 | Japan. | |
| 5-162598 | 6/1993 | Japan | 280/730.2 |
| 5-193433 | 8/1993 | Japan | 280/730.2 |

OTHER PUBLICATIONS

Patent Abstract of Japan 05016751, Jan. 26, 1993.
European Search Report.

*Primary Examiner*—Paul N. Dickson
*Attorney, Agent, or Firm*—Finnegan, Henderson, Farabow, Garrett & Dunner, L.L.P.

[57] ABSTRACT

An air bag against side collision, wherein two faces of mutually opposed peripheral wall portions having a substantially rectangular shape are connected by tethers in a strip or band-like shape whereby a distance of separation between the side wall portions in expanding the air bag is restricted. The expanded shape of the air bag is a substantially rectangular plate having four edges. An inner location near a rear edge accommodates an inflator supplying gas for expansion. Two side edges extend substantially parallel with each other from opposite ends of the rear edge and a front edge In a folded state, the front edge side of the air bag is cactus-folded such that the front edge side enters the inner side of the rear edge side of the air bag and approaches the rear edge. Tethers are connected respectively to the peripheral wall portions with a width dimension parallel with folds where the front edge side of the air bag is drawn in.

8 Claims, 5 Drawing Sheets

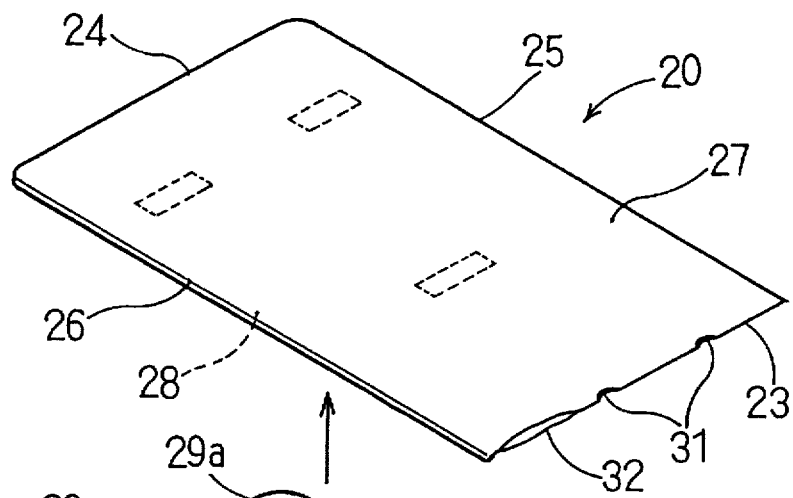
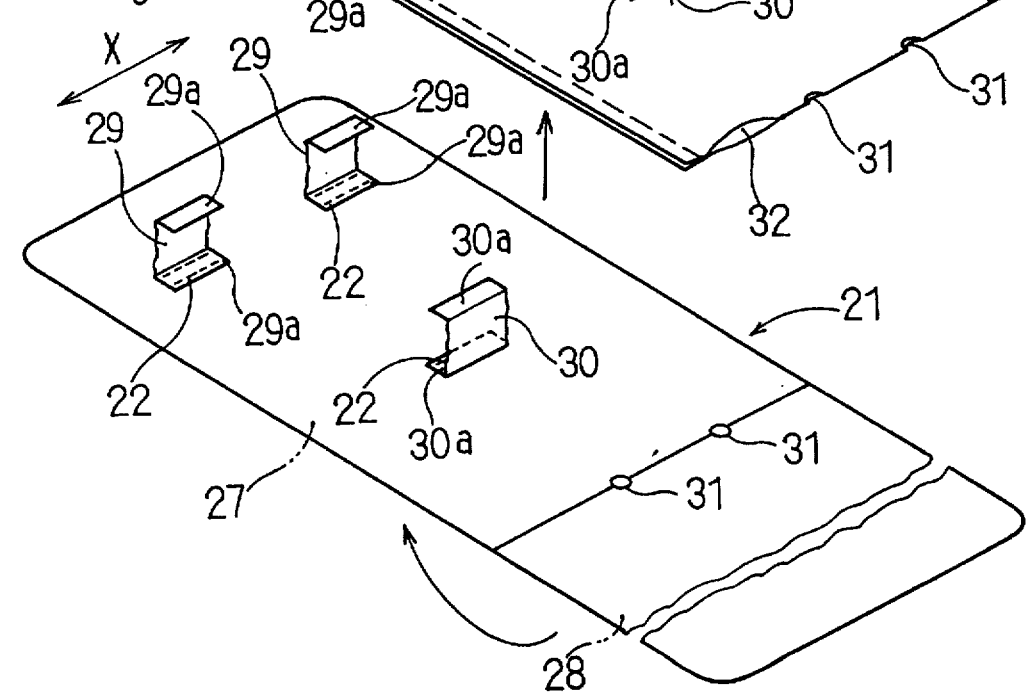

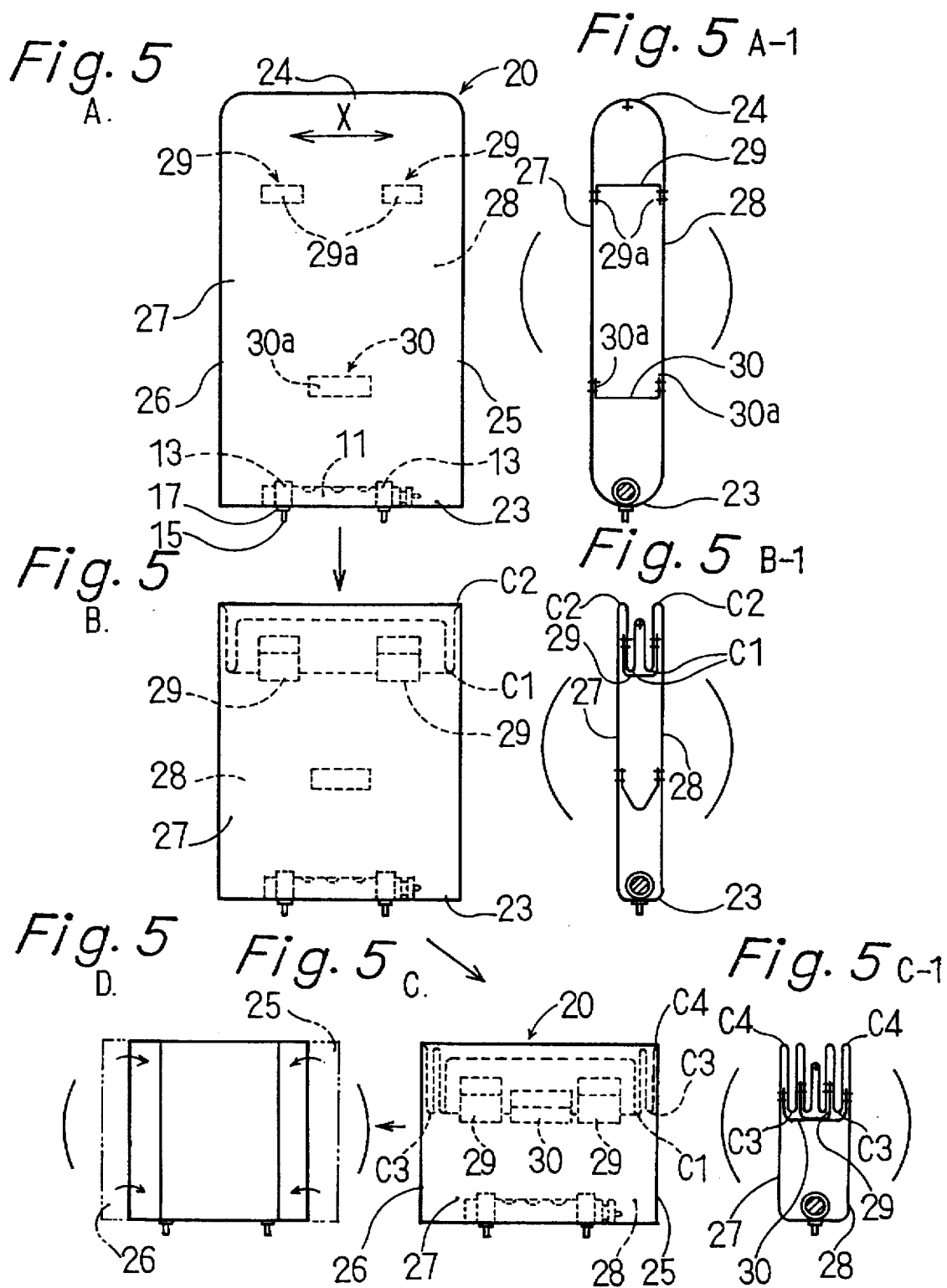

METHOD OF PREPARING A SIDE COLLISION AIR BAG

BACKGROUND OF THE INVENTION

1. Field of the Invention

The present invention relates to an automobile air bag for protection against a side collision; and more particularly to a side collision airbag device, which expands between an inner wall of a vehicle, such as a door, and a passenger.

2. Description of the Related Art

Conventionally, the expanded shape of an air bag against side collision is in the form of a substantially rectangular plate. This shape is made thin by sewing the peripheral edges of two sheets of cloth material in a substantially rectangular seam. The reason for forming such a shape is that the air bag is positioned in a narrow gap between the inner wall of a vehicle, such as a door, and a passenger when it expands.

The rear edge of the side collision air bag is connected to an inflator of the air bag device; and the front edge remote from the inflator is folded in and accommodated in a seat, for example.

A side collision air bag is folded in a style referred to as cactus-folding, as shown in FIGS. 11 through 15 of Japanese Unexamined Patent Publication No. 139238/1993(U.S. Pat. No. 5,224,732)). Cactus-folding is used because it shortens the time period for completing the expansion, and the thickness of the front end of the expanding air bag can be minimized.

However, in cactus-folding, the front edge side of the air bag remote from the inflator is basically drawn to fall into the inside of the rear edge of the air bag where the inflator is mounted. Further, in cactus-folding, the air bag is folded compactly near the side of the inflator by repeating the basic pattern successively.

Therefore, in the case of cactus-folding a side collision air bag, tethers cannot be arranged conventionally in the air bag (refer to FIG. 9 of Japanese Unexamined Patent Publication No. 139238/1993 (U.S. Pat. No. 5,224,732)). This is because tethers restrict the shape of the expanded air bag, not in a spherical shape, but in a substantially rectangular plate-like shape. Further, if tethers are arranged in an air bag, tethers interfere with the folds of the bag during the cactus-folding operation, such that the bag may not be easily folded.

In light of the foregoing there is a need for a side collision air bag that operates effectively, yet may be easily folded even when tethers are used to restrict the expanded shape of the air bag.

SUMMARY OF THE INVENTION

Accordingly, the present invention is directed to a side collision air bag that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof, as well as the appended drawings.

To achieve these and other advantages and in accordance with the purpose of the invention, as embodied and broadly described, the invention is an air bag for protection against side collision, wherein the expanded shape of the air bag is substantially rectangular and plate-like having four side edges with a rear edge being where an inflator supplying gas for expansion is mounted. Two side edges extend substantially parallel to each other from the ends of the rear edge and the ends of a front edge, and mutually connect the end portions of the two side edges to the rear edge. Two surfaces of mutually opposed peripheral wall portions in a substantially rectangular shape are connected by tethers having a strip or a band-like shape restricting the separation distance between the wall portions in expanding the air bag. The front edge of the air bag is cactus-folded to enter the inside of the bag and approach or draw closer to the rear edge; and the tethers are mutually connected respectively to the peripheral wall portions with a width direction thereof being parallel with the folds where the front edge or portion of the air bag is drawn in.

In another aspect, the invention is a method of manufacturing a side collision airbag in readiness for expansion wherein the airbag is substantially rectangular with two opposing wall portions terminating at a first edge portion for securing to a vehicle and terminating at a second edge portion opposite the first edge portion, said method comprising:

securing a plurality of tether strips, having a selected length dimension and width dimension, to opposing surfaces of the peripheral wall portions to limit separation of the opposing wall portions upon expansion by a distance corresponding to the length of the tethered strips, said width dimension being substantially parallel to the second edge portion; and folding the second edge portion to form a fold parallel with the width dimension of the tethers, and entering an inner side of the bag and approaching the first edge portion.

It is preferable to fold the air bag by bringing the tethers in contact with the folds whereby the front edge of the air bag is drawn inwardly causing the tethers to be in an extended or taut state.

The width direction of the tethers of the air bag against side collision in accordance with the present invention is parallel with the folds where the front edge is drawn inwardly. Accordingly, the tethers are connected to both of the peripheral wall portions and extend in a length direction orthogonal to the width direction.

Further, in folding the air bag, both of the peripheral wall portions approach or draw closer to each other and therefore, the tethers slacken in the direction orthogonal to the width direction.

Accordingly, even if the drawn-in folds are about to interfere with the tethers by moving toward the rear side edge of the air bag, the movement of the folds is carried out in the direction orthogonal to the width direction of the tethers. In other words, according to the cactus-folding of the air bag, the tethers and the folds may not interfere with each other due to the slackening of the tethers. As a result, the air bag can be cactus-folded with no hindrance.

Therefore, according to the side collision air bag of the present invention, the cactus-folding can be carried out easily even with the arrangement of the tethers restricting the expanded shape of the air bag.

Also, it is possible to prevent the tethers from unnecessarily folding by bringing the tethers into contact with the drawn-in folds causing the tethers to be in an extended state. As a result, the folded shape of the air bag is stabilized.

Additionally, the positioning of the folds on the outside of the bag when cactus-folding is facilitated by bringing the drawn-in folds into contact with the tethers. Accordingly, the folding operation can be swiftly performed by utilizing the tethers.

BRIEF DESCRIPTION OF THE DRAWINGS

FIGS.4A through 4C illustrate the manufacturing procedure of the embodiment of FIG. 1;

FIGS. 5A through 5D illustrate the steps of folding the embodiment of FIG.1 in accordance with the present invention;

FIGS. 5A-1, 5B-1, and 5C-1 are longitudinal sectional views of FIGS. 5A, 5B, and 5C respectively.

DESCRIPTION OF THE PREFERRED EMBODIMENTS

Figure 1:
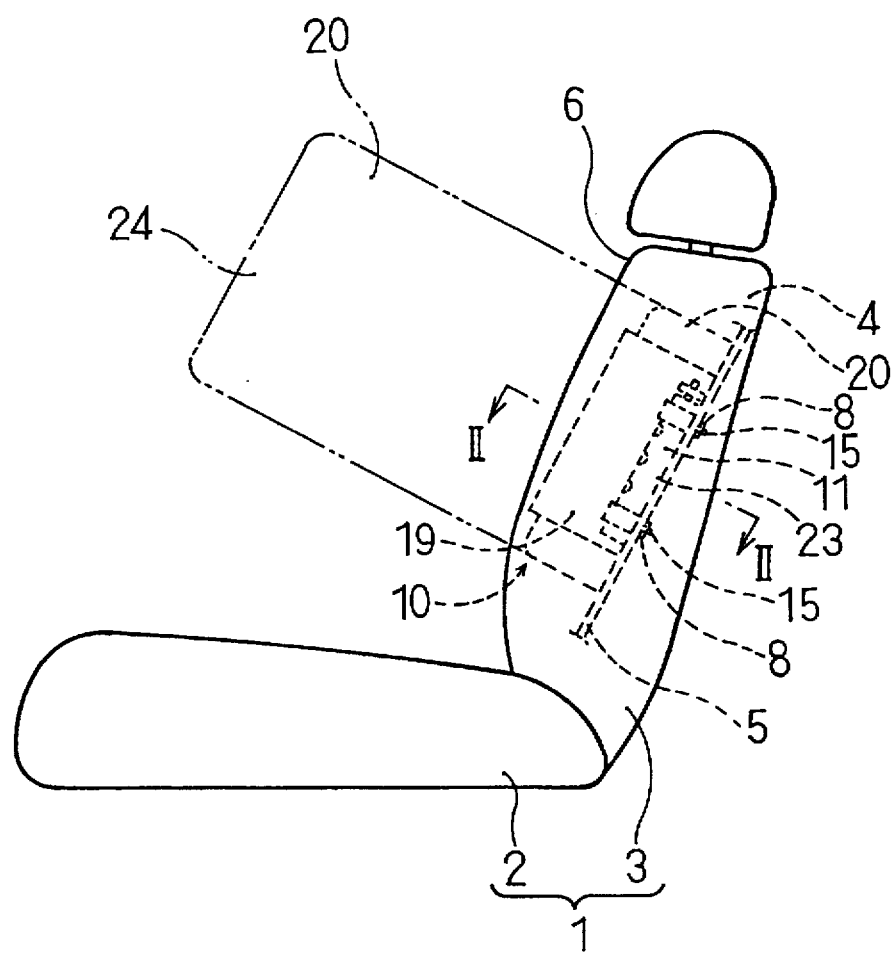
FIG. 1 is a side view showing a state of using an air bag according to a first embodiment of the present invention.

An explanation will be given of the present invention based on the embodiments illustrated in the drawings as follows.

Figure 2:
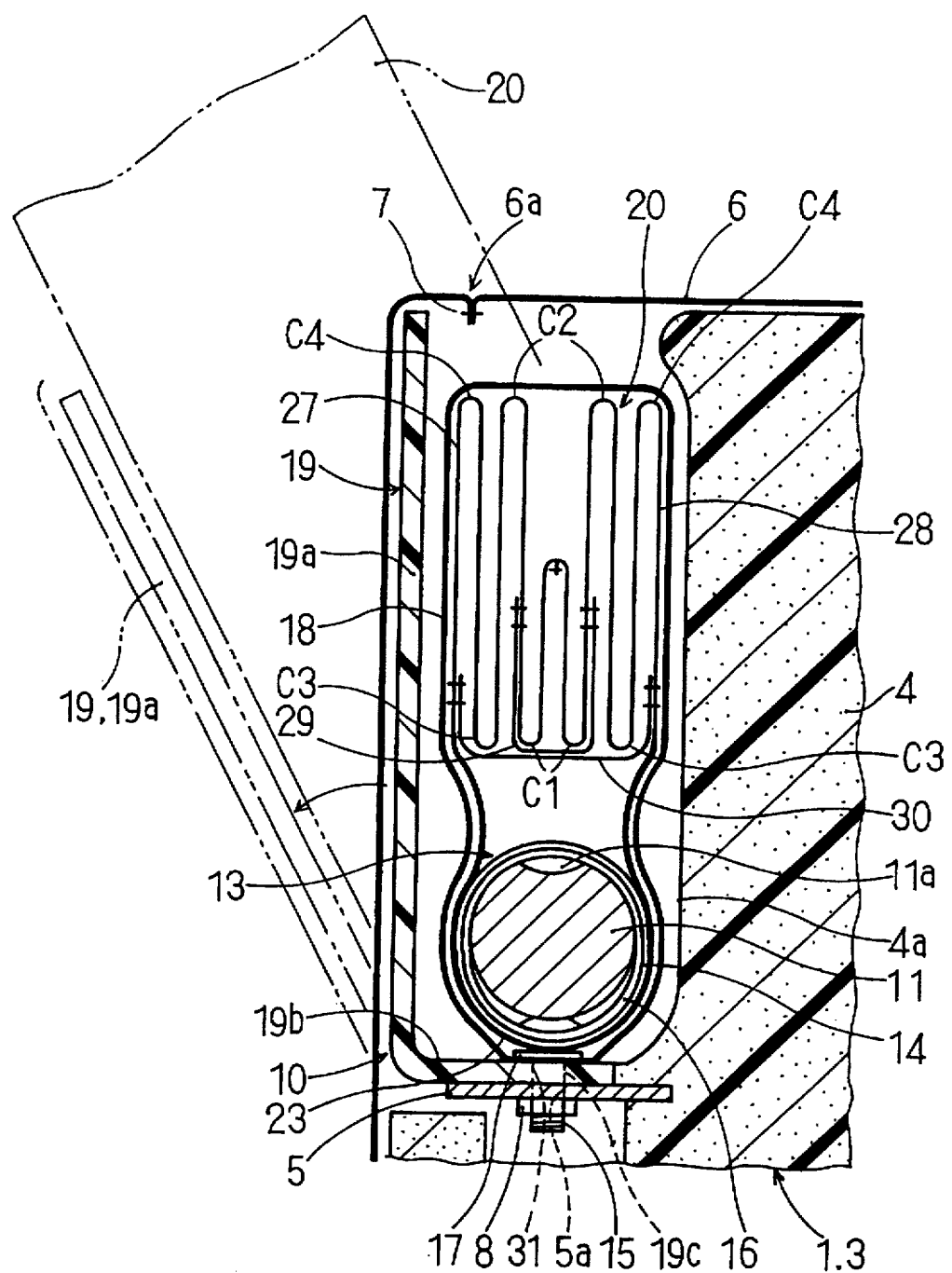
FIG. 2 is an enlarged sectional view taken along line II—II of FIG. 1.
Figure 3:
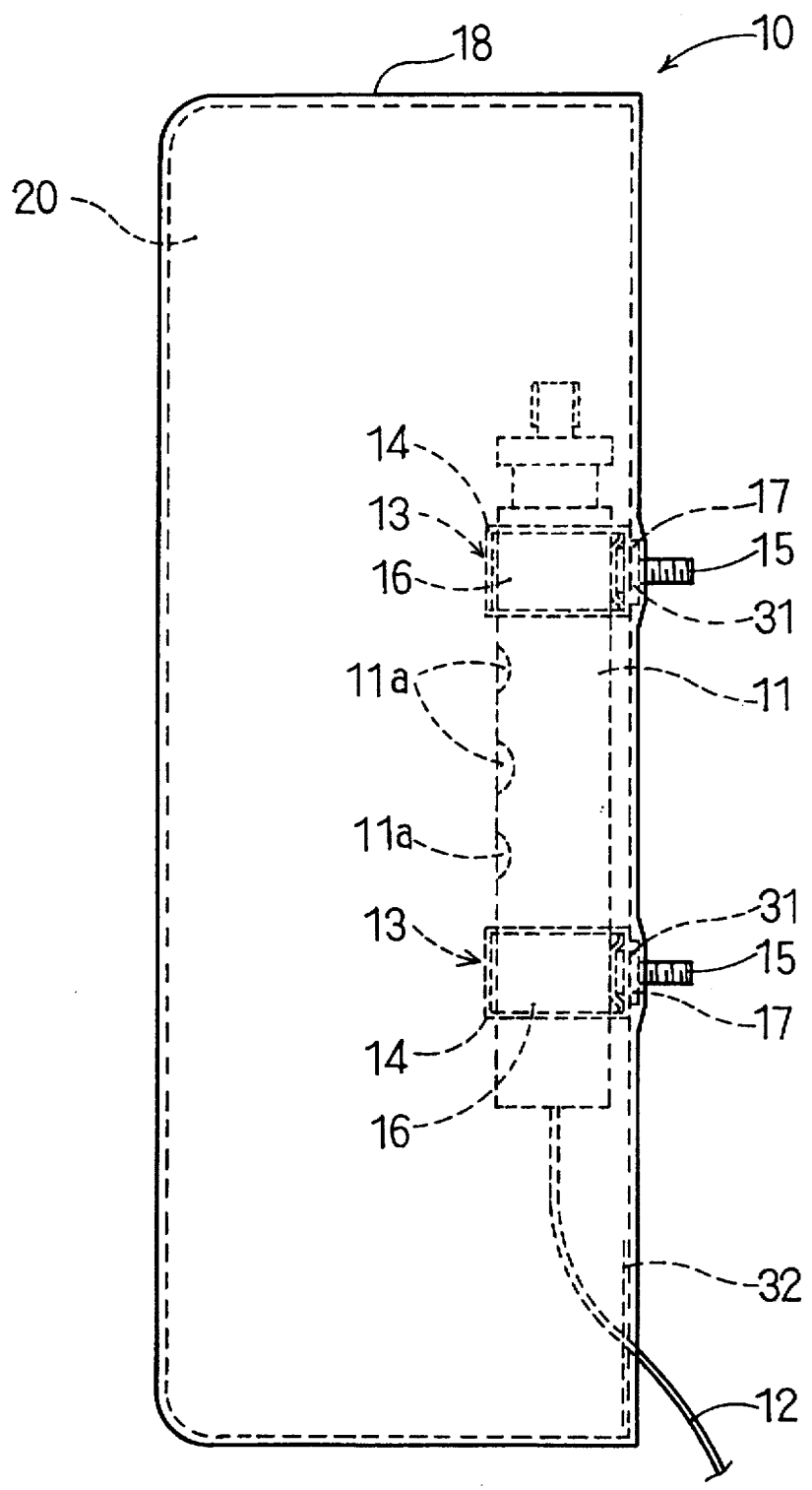
FIG. 3 is a side view of the embodiment of FIG.1.

Referring to FIG. 1, a seat 1 has a seat portion 2 and a seat back 3. As illustrated in FIGS. 1, 2 and 3, an air bag 20 is used in a side collision air bag device 10. The air bag device 10 is intended to be mounted on the side of the seat back 3 adjacent the door side of a vehicle.

The seat back 3 has a main body 4 made of urethane, for example. An accommodation recess 4a extending in an up and down direction is formed at a left side of the main body 4. A frame 5 is arranged in the accommodation recess 4a facing the rear side of the vehicle. The frame 5 extends substantially in an up and down direction with the upper side inclined in a rearward direction. The frame 5 is provided with attaching holes 5a arranged at two predetermined locations. A skin 6 which is, for example, an ornamental cloth is arranged on the outside of the seat back 3. A seam 6a is formed on the skin 6 at the front side face of the accommodation recess 4a. The seam 6a is formed by sewing a previously cut portion of the skin 6 with thread 7. Seam 6a facilitates the breaking of the skin 6 upon the expanding of the air bag 20.

The air bag apparatus 10 includes an inflator 11, an air bag 20, and a cover 19. The air bag 20 is folded in the style of cactus-folding. The inflator 11 has a substantially cylindrical shape, and is provided with a plurality of gas discharge ports 11a in its peripheral surface. The inflator 11 is mounted in the air bag 20 at a rear edge 23. A lead wire 12 is connected to the lower end of the inflator 11. The lead wire 12 is connected to a connector, not illustrated, communicating with an air bag operating circuit to input a gas generation signal to the inflator 11. The lead wire 12 is inserted through a vent hole 32 of the air bag 20.

Two brackets 13 are fixedly attached to the top portion and the bottom portion of the inflator 11. Each of the attaching brackets 13 is a cylinder made by plate drawing, and provided with a sleeve 14 and a cushion material 16. A bolt 15 is welded to the sleeve 14 to project in the radial direction. The cushion material 16 is fixedly attached to the inner peripheral face of the sleeve 14. The inner diameter of the sleeve 14 is larger than the outer diameter of the inflator 11.

The brackets 13 are attached and fixed to the inflator 11 as follows. First, the sleeves 14 are mounted on the inflator 11 via the cushion materials 16. Next, the sleeves 14 are caused to partially contract so that the brackets 13 can be attached and fixed to the inflator 11.

The bolt 15 of each of the attaching brackets 13 is inserted into an attaching hole 31 of the air bag 20 (refer to FIGS. 3 and 4). Each of the bolts 15 is inserted into the attaching hole 5a of the frame 5 via a spring nut 17 and a bracket 19b of the cover 19. A nut 8 is screwed to each of the bolts 15. By fastening the nuts 8, the air bag device 10 is fixedly attached to the seat back 3.

The cover 19 is made of synthetic resin and is constituted by a main body 19a and bracket 19b. The main body 19a has a rectangular plate configuration covering a side face of the seat back main body 4. The bracket 19b is formed by being bent from an end portion of the main body 19a in a direction orthogonal to the plane of the main body 19a. The bracket 19b is provided with two attaching holes 19c for receiving the bolts 15.

The expanded air bag 20 has a substantially rectangular plate-like shape as illustrated by two-dotted chain lines in FIGS. 1 and 2 and FIG. 5A. The expanded air bag 20 has a rectangular shape with four edges 23, 24, 25 and 26 and wall portions 27 and 28 with the peripheral edges of the wall portions 27 and 28 connected to each other. The edge 23 is a rear edge of the bag at the side of the inflator 11. The edges 25 and 26 are side edges extending parallel with each other from opposite ends of the rear edge 23; and the edge 24 is a front edge mutually connecting opposite end portions of the side edges 25 and 26 and opposing the rear edge 23.

As illustrated in FIGS. 4A–4C, the air bag 20 is provided with two attaching holes 31 and a vent hole 32 in a slit-like configuration. Tethers 29 and 30, which connect the wall portions 27 and 28 to one another are mounted inside the air bag 20. The tethers 29 and 30 prevent the air bag 20 from assuming a spherical shape when expanded and restrain it to maintain a substantially a rectangular plate shape. The tethers 29 and 30 are formed in a strip or band-like configuration by using woven cloth made of polyamide, polyester or the like, similar to a base cloth 21 from which the air bag 20 is made. Each of the tethers 29 and 30 has a length defined by opposite end portions 29a and 30a and a width in a direction referred to as X. The pair of tethers 29 closest to the front edge 24 are sometimes referred to as first tethers. The two strips corresponding to the first tethers 29 are spaced from each other with one tether 29 disposed close to but spaced from the side edge 25 and the other tether 29 close to but spaced from the side edge 26. The tether 30 is spaced from the front edge 24 and the pair of tethers 29 rearwardly of the tethers 29 toward the rear side edge 23. Tether 30 may be referred to herein as the second tether. The second tether 30 is disposed approximately equidistant from the side edges 25 an 26 and the rear and front edges 23 and 24.

As illustrated in FIGS. 4A–4C and 5A–5D, opposite end portions 29a and 30a of the tethers 29 and 30, respectively, are sewn onto the inner opposing surfaces of the peripheral wall portions 27 and 28. Further, the tethers 29 and 30 are sewn on the opposing inner surfaces of the wall portions 27 and 28 such that the width direction X of the respective strips are substantially parallel with the front and rear side edges and folds C1 and C3 of the cactus-folding portions. Further, the two first tethers 29 are also parallel with the fold C1 where the bag is folded in the first cactus fold.

Methods of manufacturing the air bag 20 are explained as follows. First, as shown in FIG. 4C, the base cloth 21 is cut in a predetermined form. The base cloth 21 is a woven cloth made of polyamide, polyester or the like. The base cloth 21 is perforated to form attaching holes 31 which are located midway between opposite ends of the base cloth approximately equidistant from each other and the adjacent side edge of the base cloth 21. Further, the portion 29a and 30a at one end of the tethers 29 and 30 are sewn to the base cloth 21 that corresponds to one of the wall portions 27 and 28 by utilizing sewing thread 22.

Next, as shown in FIG. 4B, the base cloth 21 is folded in two at the center, and the vent hole 32 is formed by cutting a portion of the fold.

Further, as illustrated in FIG.4A, the base cloth 21 is turned inside out by utilizing the vent hole 32. The end portions 29a and 30a at the opposite end of the tethers 29 and 30 are sewn to the other one of the wall portions 27 and 28.

The air bag 20 may also be manufactured by preparing two individual sheets of base cloth with a seam margin added to the wall portions 27 and 28, then sewing peripheral portions of the two sheets of the base cloth and turning the base cloth inside out. In this case, the attaching holes 31 and the vent hole 32 are formed by partially discontinuing the seam of the base cloth.

As illustrated in FIG. 2 and FIG. 5C, the front edge 24 of the air bag 20 is cactus-folded in two stages such that the front edge 24 is drawn in toward the inner side of the rear edge 23 and approaches or extends toward the rear edge 23.

According to the method of folding the air bag 20, as illustrated in FIG. 5A, the inflator 11 to which the attaching brackets 13 are previously attached is inserted into the air bag 20 through the vent hole 32. Further, the bolts 15 of the respective attaching brackets 13 are projected from the attaching holes 31. The spring nut 17 is mounted to each of the bolts 15. The periphery of each of the attaching holes 31 is pressed by the spring nut 17.

Next, as illustrated in FIG. 5B, the first cactus folding is carried out such that the surrounding portions of the front edge 24 fold between the front edge 24 and the peripheral wall portions 27 and 28 while the front edge 24 remains projected. In this case, positioning of outer folds C2 in the first cactus-folding can be facilitated by bringing the folds C1, whereby the cactus-folding is formed, into contact with the first tethers 29.

Thereafter, as illustrated in FIG. SC the portions which have been folded by the first cactus-folding are drawn to fall between the peripheral wall portions 27 and 28 to fold therebetween whereby a second cactus-folding is accomplished, and the folding operation is finished. In this case, if the folds C3, forming cactus-folding, are brought into contact with the second tether 30, the positioning of outer folds C4 in the second cactus-folding can be facilitated (Incidentally, in the longitudinal sectional views of FIGS. 5B and 5C, gaps are illustrated between the tethers 29 and 30 and the folds C1 and C3 to facilitate understanding. However, in actual practice, there are no such gaps.

According to the cactus-folding of the first embodiment, the width direction X of each of the tethers 29 and 30 is parallel with the plane of folds C1 and C3 whereby the front edge 24 is drawn in. Therefore, the tethers 29 and 30 are connected by end portions 29a and 30a respectively to both wall portions 27 and 28 and extend in a direction orthogonal to the width direction X.

Further, in folding the bag, both of the wall portions 27 and 28 approach each other and accordingly, the tethers 29 and 30 slacken in the direction orthogonal to the width direction X.

Therefore, even if the drawn-in folds C1 and C3 are moved to the side of the rear edge 23 of the air bag 20 and about to interfere with the tethers 29 and 30, the foldings C1 and C3 are moved into a direction orthogonal to the width direction X of the tethers 29 and 30. In other words, it is possible for the tethers 29 and 30 and the fold C1 and C3 not to interfere with each other due to the slackening of the tethers 29 and 30. As a result, the air bag 20 can be cactus-folded with no hindrance.

Accordingly, in the side collision air bag 20 of the first embodiment, the cactus-folding can be accomplished easily even with the arrangement of the tethers 29 and 30 restricting the expanded shape of the bag.

Furthermore, the tethers 29 and 30 are caused to be in an extended state by being brought into contact with the folds C1 and C3 whereby the side of the front edge 24 is drawn in. Therefore, unnecessary folding of the tethers 29 and 30 can be prevented and the folded shape of the air bag 20 stabilized.

Also, the positioning of the outer folds C2 and C4 in the cactus-folding can be facilitated by bringing the drawn-in folds C1 and C3 into contact with the tethers 29 and 30. Therefore, the folding operation of the air bag 20 can swiftly be conducted by utilizing the tethers 29 and 30.

Additionally, the side edges 25 and 26 of the air bag may be folded inwardly toward the center as illustrated in FIG. SD after finishing the cactus-folding. In this way the air bag 20 is folded to be still more compact.

It is preferable to cover the folded air bag 20 in the one embodiment by a thin film 18, such as a breakable thermally contractive film, for example. Thereby, deformation of the folded shape of the air bag 20 after it has been folded can be prevented. When the air bag 20 is covered by the film 18, the bolts 15 of the respective attaching brackets 13 protrude from the film 18.

After folding the air bag 20, the bolts 15 of the respective brackets 13 are inserted through the respective attaching holes 19c of the bracket 19b and the respective attaching holes 5a of the frame 5. Successively, the nuts, 8 are screwed to the respective bolts 15 whereby the air bag device 10 comprising the air bag 20, the inflator 11 and the cover 19 is integrated and attached to the frame 5.

After attaching the air bag device 10 to the frame 5, the skin 6 is mounted on the seat back main body 4, thereby completing the seat 1. The completed seat 1 is mounted the t vehicle and the terminal of the lead wire 12 is connected to a predetermined connector whereby the air bag device 10 can be mounted to the vehicle.

According to the air bag device 10 of the first embodiment, after mounting it to the seat 1 of the vehicle, when an electric signal for gas generation is input to the inflator 11 via the lead wire 12, it operates as follows. Gas is discharged from the gas discharge ports 11a by the inflator 11. Then, the air bag 20 breaks the film 18 and the skin 6, opens the main body 19a of the cover 19 and is significantly expanded in the forward direction as illustrated by the twodotted chain lines in FIG. 2.

According to the first embodiment two sheets or strips are used for the first tethers 29. However, one strip may be arranged at an intermediate position between the first tethers 29. Further, instead of two sets of the firs t tethers 29 and the second tether 30, one sheet thereof may be arranged at the central portion between the peripheral wall portions 27 and 28. When a plurality of sheets thereof are arranged in a direction orthogonal to the front and rear direction of the air bag, these should be arranged in parallel with folds where the cactus-folding is formed as in the first tethers 29 of the first embodiment. Further, when a plurality of strips are arranged along the front and rear direction of the air bag, the cactus-folding is conducted a number of times that is the same as the number of stages whereby the plurality of strips of tethers are arranged along the front and rear direction of the air bag. When a plurality of tethers are arranged in the front and rear direction of the air bag, it is necessary to arrange tethers in consideration of a fold width at every cactus-folding. This is because if the tethers are arranged in the proximity to each other such that the fold width cannot be, provided, the cactus-folding cannot be carried out.

According to the first embodiment the air bag is folded to cause the respective tethers 29 and 30 to be in an extended state.

Furthermore, according to the respective embodiments the folding is carried out from the front edge 24 in cactus-folding the air bag 20. However, the folding may be started from the rear edge 23 of the air bag such that the folds C3 and C4 are initially formed and the folds C1 and C2 are formed subsequently.

Furthermore, according to the respective embodiments the inflator 11 is disposed in the air bag 20. However, a gas flow inlet may be formed at the rear edge 23 of the air bag 20 and the inflator may be mounted outside of the air bag 20.

It will be apparent to those skilled in the art that various modifications and variations can be made in the method and apparatus of the present invention without departing from the spirit or scope of the invention. Thus, it is intended that the present invention cover the modifications and variations of this invention provided they come within the scope of the appended claims and their equivalents.

What is claimed is:

1. A method of preparing a side-collision air bag in readiness for expansion wherein the air bag is substantially rectangular with two opposing walls having opposing surfaces and terminating at a rear edge for securing to a vehicle and terminating at a front edge opposite the rear edge, and having two side edges extending substantially in parallel from the rear edge to the front edge, and having provision adjacent the rear edge for supplying a gas for expansion of the air bag, said method comprising:

securing at least one tether in the shape of a strip to opposing surfaces of the opposing walls, said at least one tether having a selected length and limiting separation of the opposing walls upon expansion by a distance substantially corresponding to the selected length of the at least one tether;

folding the air bag by folding in the front edge, side edges, and opposing walls into foldings constituting a cactus fold, and approaching the rear edge with the foldings of the cactus fold along the opposing surfaces of the opposing walls;

positioning said at least one tether during the securing step in a width direction that becomes parallel to the foldings during the folding step; and bringing during the folding step the foldings into contact with the at least one tether to extend the at least one tether in a length direction and cause the opposing walls to be drawn in.

2. The method of claim 1 wherein the at least one tether is a plurality of tethers, and during the folding step more than one of the plurality of tethers are caused to be extended in the length direction by bringing the foldings into contact therewith.

3. The method of claim 2, further comprising:

spacing during the securing steps the tethers from one another in a direction parallel with the foldings.

4. The method of claim 2, further comprising:

spacing the tethers to define a number of stages between the front and rear edges of the air bag;

folding during the folding step a cactus fold the same number of times as the number of stages of the tethers; and drawing in successively at each cactus fold the opposing walls.

5. The method of claim 1, further comprising:

edge-folding the side edges inwardly to overlie one of the opposing walls of the folded air bag.

6. The method of claim 2, further comprising:

edge-folding the side edges inwardly to overlie one of the opposing walls of the folded air bag.

7. The method as in any one of the preceding claims, further comprising:

covering the folded air bag with a thin, breakable film.

8. The method as in any of claims 1–6, further comprising:

providing a vent hole in the air bag;

placing an inflator adjacent the rear edge of the air bag through the vent hole, the inflator for supplying gas for expansion of the air bag;

assembling at the inflator bolts for attaching the air bag to a seat back of a vehicle seat;

causing the bolts to protrude from the air bag through holes adjacent the rear edge of the air bag;

fastening the bolts to the air bag with spring nuts; and covering the folded air bag with a thin, breakable film, the bolts protruding through the film.

* * * * *